(12) United States Patent
Kirkman

(10) Patent No.: US 7,958,749 B2
(45) Date of Patent: Jun. 14, 2011

(54) FLOATING MOUNT BOTTOM PLATE HOLDER IN A GLASSWARE FORMING MACHINE

(75) Inventor: Thomas R. Kirkman, Napoleon, OH (US)

(73) Assignee: Owens-Brockway Glass Container, Inc., Perrysburg, OH (US)

( * ) Notice: Subject to any disclaimer, the term of this patent is extended or adjusted under 35 U.S.C. 154(b) by 712 days.

(21) Appl. No.: 11/818,363

(22) Filed: Jun. 14, 2007

(65) Prior Publication Data
US 2008/0307831 A1 Dec. 18, 2008

(51) Int. Cl.
C03B 9/335 (2006.01)
(52) U.S. Cl. ............................. 65/261; 65/361
(58) Field of Classification Search .................... 65/361, 65/263, 267, 265, 323, 356
See application file for complete search history.

(56) References Cited

U.S. PATENT DOCUMENTS

| | | | |
|---|---|---|---|
| 3,175,895 A | 3/1965 | Zappia | |
| 3,281,228 A | 10/1966 | Andersen | |
| 3,314,775 A | 4/1967 | De Shetler et al. | |
| 4,272,273 A | 6/1981 | Trahan et al. | |
| 4,579,576 A | 4/1986 | Jones | |
| 4,657,573 A * | 4/1987 | Jones | 65/265 |
| 4,701,202 A | 10/1987 | Foster | |

FOREIGN PATENT DOCUMENTS

| | | |
|---|---|---|
| DE | 3123488 | * 11/1982 |
| JP | 2001278628 | 10/2001 |
| JP | 2002356333 | 12/2002 |

OTHER PUBLICATIONS

DE 3123488 (Human Translation), [The Mcelroy Translation Company], Jul. 2010.*
Drawing of prior art bottom plate mounting assembly described at p. 1, lines 5-17 of application text, Application filed Jun. 14, 2007.

* cited by examiner

Primary Examiner — Matthew J Daniels
Assistant Examiner — Yana Belyaev

(57) ABSTRACT

A glassware mold bottom plate mounting arrangement in a glassware forming machine includes a floating ring captured by a cap plate on a base for limited lateral movement with respect to the base and the cap plate. A hollow spud is rigidly secured to and extends from the ring. A cooling wind passage in the base opens through the hollow spud, and a vacuum passage in the base opens through the ring at a position spaced from the spud. A glassware mold bottom plate is removably telescopically received over the ring and the spud. The bottom plate has a central air passage received over the spud, an annular recess received over the ring, and a peripheral air passage that opens into the annular recess such that the central and peripheral air passages open to the cooling wind and vacuum passages in the base through the spud and the ring respectively. The spud and the ring preferably have external seals in respective sliding sealing engagement with the central air passage and the annular recess in the bottom plate. There preferably are face seals between the base and the floating ring, and between the ring and an undersurface of the cap plate.

14 Claims, 4 Drawing Sheets

FLOATING MOUNT BOTTOM PLATE HOLDER IN A GLASSWARE FORMING MACHINE

The present disclosure relates to a glassware mold bottom plate mounting arrangement in a glassware forming machine, and more particularly to a bottom plate mounting assembly that permits limited lateral motion or float with respect to the mounting base.

BACKGROUND AND SUMMARY OF THE DISCLOSURE

A blow mold in a typical glassware forming machine includes at least one pair of mold halves that are brought together around a bottom plate to form the blow mold cavity. The bottom plate typically includes a central air passage for receiving cooling wind to cool the portion of the bottom plate against which the glass is blown, and one or more vacuum passages for feeding vacuum to the blow mold sections to help draw the glass against the mold surfaces during the blowing operation. The bottom plate is mounted on a base that has a floating spud for receipt into the central air passage of the bottom plate and a fixed annular ring around the spud for receipt within an annular recess at a lower end of the bottom plate. An absence of adequate sealing between the spud and its mounting base, and between the spud and the bottom plate, results in leakage of cooling wind to the vacuum passage in the mounting base. Furthermore, fixed mounting of the outer ring on the base necessitates a fairly large annular gap between the outer ring and the opposing surface of the annular recess in the bottom plate, so that the seal carried by the outer ring is largely unsupported and prone to fracture when installing the bottom plate over the outer ring. A general object of the present disclosure is to provide a bottom plate mounting arrangement in a glassware forming machine that addresses one or more of these deficiencies in the prior art.

The present disclosure embodies a number of aspects that can be implemented separately from or in combination with each other.

A glassware mold bottom plate mounting arrangement in a glassware forming machine, in accordance with one aspect of the present disclosure, includes a floating ring captured by a cap plate on a base for limited lateral movement with respect to the base and the cap plate. A hollow spud is rigidly secured to and extends from the ring. A cooling wind passage in the base opens through the hollow spud, and a vacuum passage in the base opens through the ring at a position spaced from the spud. A glassware mold bottom plate is removably telescopically received over the ring and the spud. The bottom plate has a central air passage received over the spud, an annular recess received over the ring, and a peripheral air passage that opens into the annular recess such that the central and peripheral air passages open to the cooling wind and vacuum passages in the base through the spud and the ring respectively. The spud and the ring preferably have external seals in respective sliding sealing engagement with the central air passage and the annular recess in the bottom plate. There preferably are face seals between the base and the floating ring, and between the ring and an undersurface of the cap plate.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
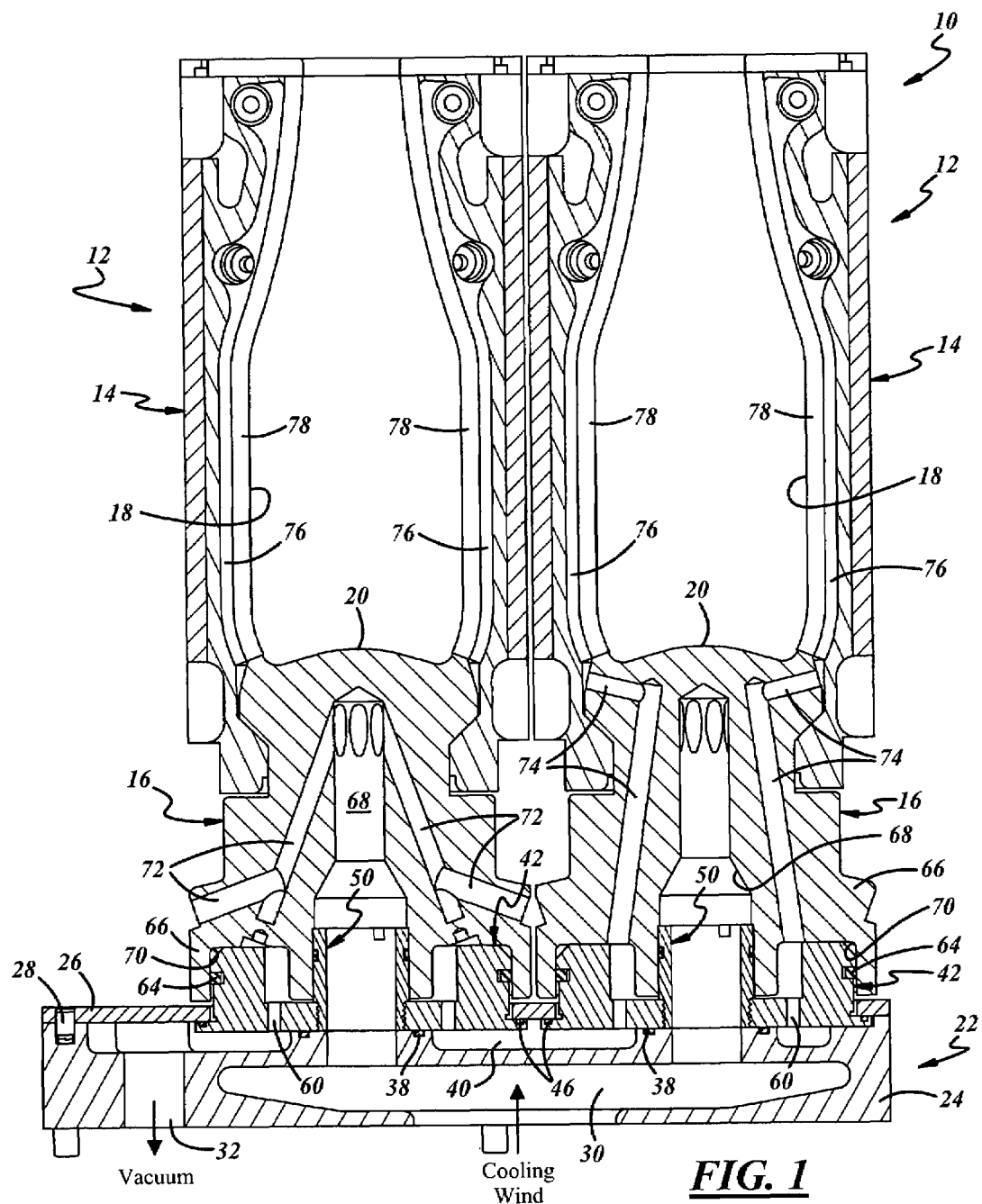
FIG. 1 is a sectional view of a glassware mold bottom plate mounting arrangement in accordance with an exemplary embodiment of the present disclosure.
Figure 2:
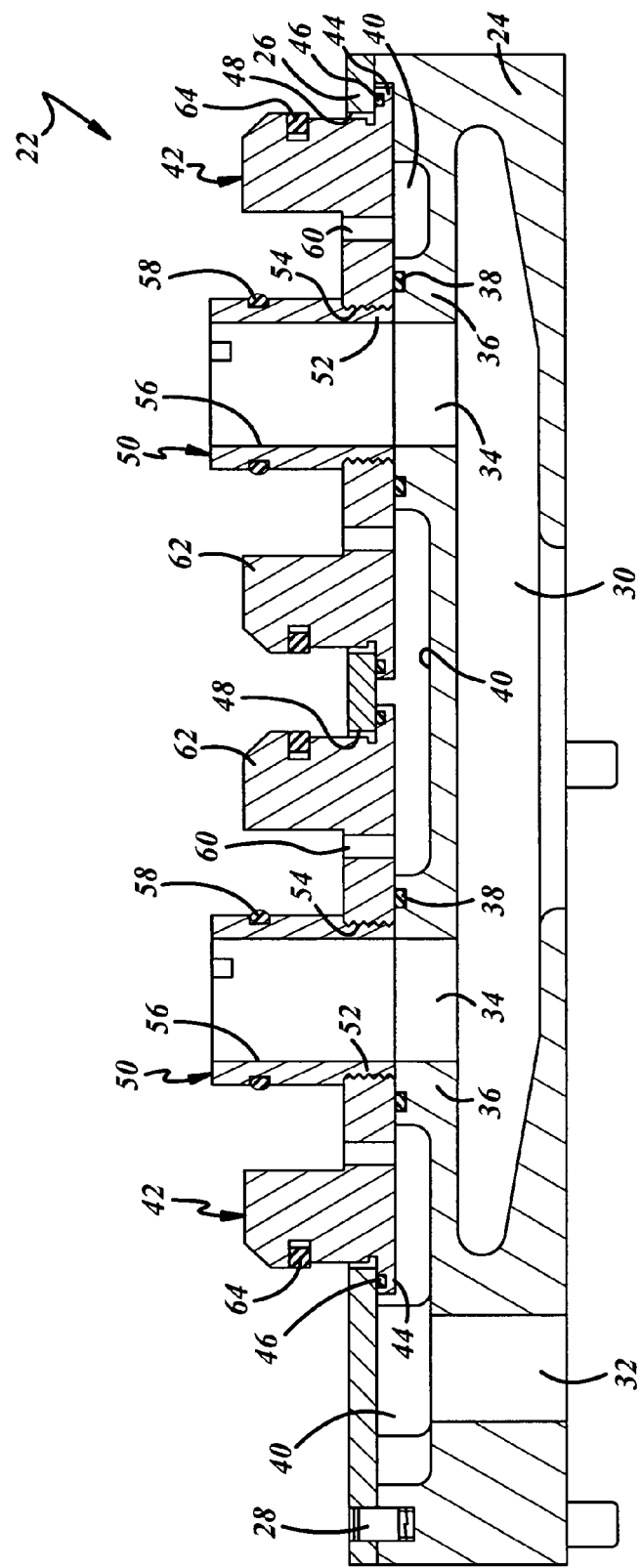
FIG. 2 is a sectional view of the bottom plate mounting assembly illustrated in FIG. 1.
Figure 3:
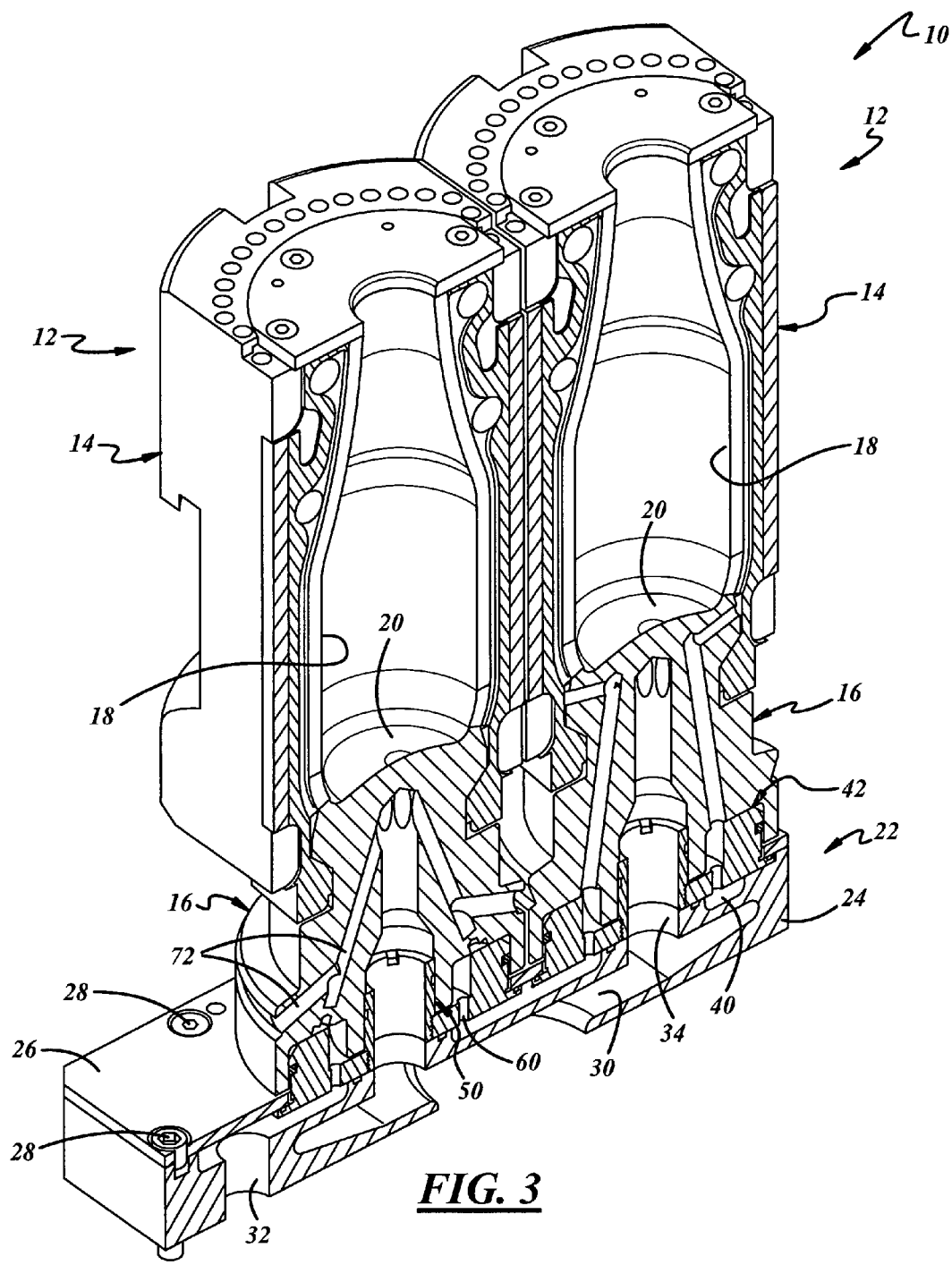
FIG. 3 is a perspective sectional view similar to that of FIG. 1.
Figure 4:
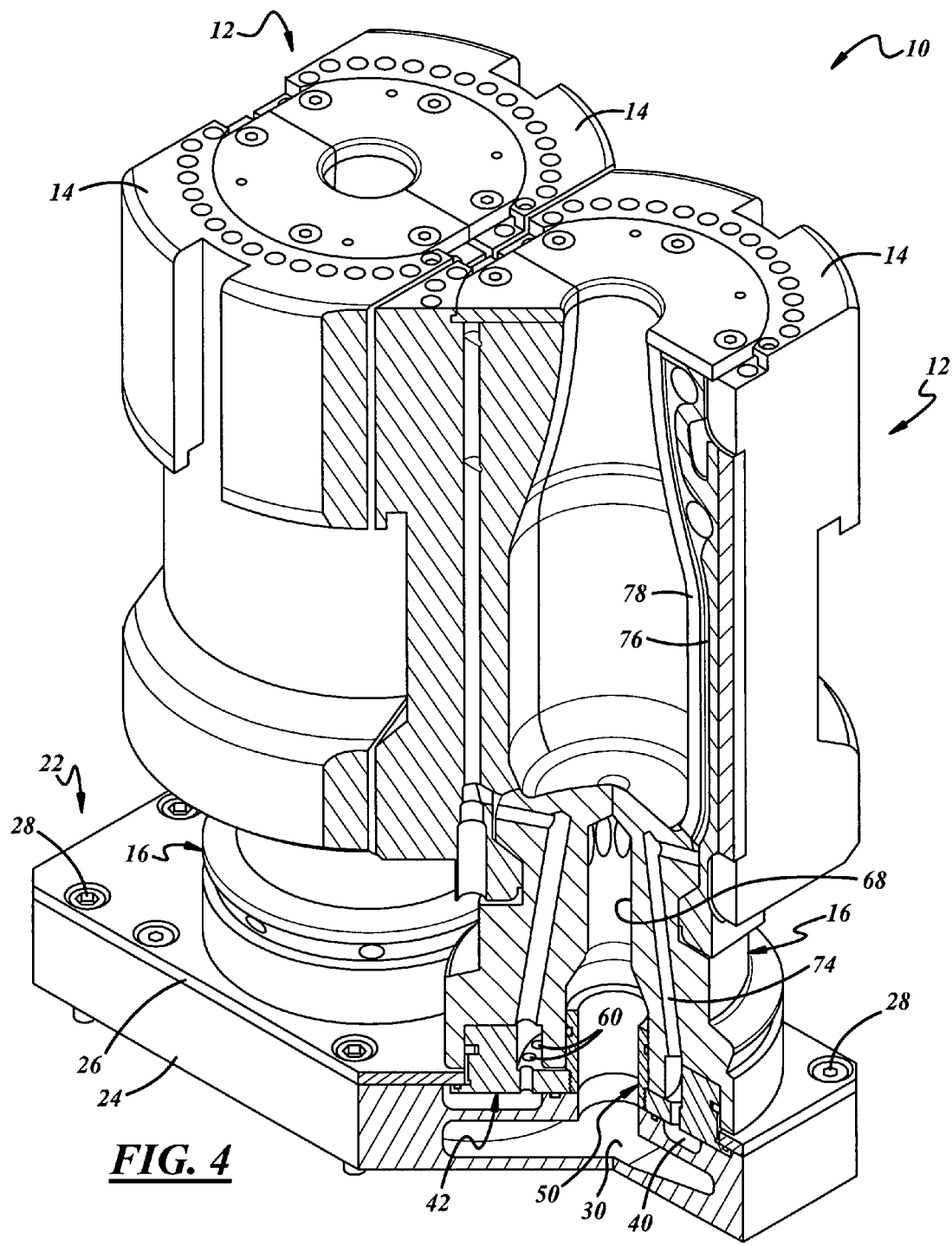
FIG. 4 is a perspective sectional view of the glassware mold bottom plate mounting arrangement in FIGS. 1-3.

FIGS. 1, 3 and 4 illustrate a portion of an exemplary blow station in a glassware forming machine 10. The illustrated exemplary embodiment includes a pair of blow molds 12, although a greater or lesser number of blow molds could be provided. Each blow mold 12 includes a pair of blow mold sections or halves 14 closable around a bottom plate 16 to form a blow mold cavity 18. The upper surface 20 of bottom plate 16 thus forms the blow mold surface against which the base or bottom of the glassware article is molded. Blow mold halves or sections 14 typically are mounted for opening and closing movement with respect to bottom plates 16 to open and close the blow mold cavities. Bottom plates 16 are relatively stationary, although there is a limited "float" for each bottom plate to accommodate closing of the blow mold halves. Blow molds 12 are illustrated in the closed position in FIGS. 1, 3 and 4.

Bottom plate 16 is mounted on a bottom plate mounting assembly 22. Assembly 22 includes a base 24 to which a cap plate 26 is secured, such as by an array of fasteners 28. A first air passage 30 in base 24 receives cooling wind for cooling bottom plates 16, and a second air passage 32 in base 24 is connected to a vacuum source. Passage 30 connects to an opening 34 that is surrounded by a shoulder 36. A face seal 38, preferably an annular face seal such as an O-ring, is carried in a recess on shoulder 36 surrounding passage 34. Vacuum passage 32 is connected to a pocket 40 that surrounds shoulder 36. In the illustrated exemplary embodiment in which there are two bottom plates 16, there are two spaced openings 34 with associated shoulders 36 and face seals 38.

An outer ring 42 has a flat bottom face disposed in sliding engagement with face seal 38 carried by base shoulder 36. Outer ring 42 has a radially outwardly extending ledge or flange 44 that carries a face seal 46, preferably an annular face seal such as an O-ring, in sliding sealing engagement with an undersurface of cap plate 26. Cap plate 26 thus captures ring 42 on base 24 but permits limited lateral movement of ring 42 on base 24 within the limits of the opening 48 in cap plate 26 through which ring 42 extends. A spud 50 is rigidly secured to ring 42 so that the spud and ring form an integral piece. Spud 50 preferably has a lower end 52 with external threads that are received within an internally threaded opening 54 in ring 42. The spud and the ring optionally could be made as one piece. Spud 50 thus floats with ring 42 with respect to base 24 and cap plate 26. Spud 52 preferably is cylindrical and has a hollow interior that forms a passage 56 that registers with opening 34 to cooling wind passage 30 in base 24. Spud 50 preferably carries an external seal 58, most preferably an annular seal such as an O-ring disposed in an associated radially outwardly facing groove or channel in the outer surface of spud 50. Ring 42 has at least one passage 60, and preferably an angularly spaced array of passages 60, that register with vacuum pocket 40 in base 24. An upstanding annular collar 62 on ring 42 is disposed radially outward of vacuum passages 60 and carries a radially outwardly facing floating seal ring 64. Seal ring 64 in the exemplary embodiment is an expansible piston-type sealing ring disposed in an associated groove or channel on the outer surface of collar 62. In the exemplary embodiment of the disclosure having two adjacent blow molds 12, there is a second ring 42 and spud 50, etc. captured on base 24 by cap plate 26.

Each bottom plate 16 includes a base 66 having a central passage 68 removably telescopically received over spud 50 and an annular recess 70 removably telescopically received over collar 62 of ring 42. Seal 58 on spud 50 is in sliding sealing engagement with central passage 68 in bottom plate base 66, and seal 64 on ring 42 is in sliding sealing engagement with a radially inwardly facing surface of recess 70. Thus, bottom plate 16 is carried by ring 42 and spud 50 for limited lateral movement or float with respect to base 24 and cap plate 26. Central passage 68 of bottom plate 16 receives cooling wind through spud 50, which can be exhausted from bottom plate 16 by any suitable means, such as passages 72 illustrated in FIGS. 1 and 3. In the same way, vacuum is fed through opening 60 in ring 42 to peripheral vacuum passages 74 in bottom plate 16, and thence to vacuum passages 76 in mold sections 12 (FIGS. 1, 3 and 4). (The vacuum in passage 76 preferably operates through mold seams 78 to help draw the molten glass toward mold surfaces 18.) Seal 58 on spud 60 and seal 38 on base 24 function to seal the cooling wind passages from the vacuum passages. Face seal 46 on ring 42 seals the vacuum passages from outside air. Furthermore, since outer ring 42 floats with respect to base 24 and cap plate 26, seal 64 is not required to float leaving less of the ring exposed and reducing breakage during installation of bottom plate 16 over ring 42. Spud 50 and ring 42 are rigidly tied together and float as a unit.

There thus has been disclosed a glassware mold bottom plate mounting arrangement that fully satisfies all of the objects and aims previously set forth. The disclosure has been presented in conjunction with an exemplary embodiment, and modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. A glassware mold bottom plate mounting arrangement in a glassware forming machine, which includes:
    a base and a cap plate on said base,
    a floating ring captured by said cap plate on said base for limited lateral movement with respect to said base and said cap plate,
    wherein said floating ring has an annular flange that underlies said cap plate,
    a hollow spud rigidly secured to said floating ring and extending from said floating ring,
    a cooling wind passage in said base opening through said hollow spud,
    a vacuum passage in said base opening through said floating ring at a position spaced from said spud, and
    a glassware mold bottom plate removably telescopically received over said floating ring and said spud, said bottom plate having a central air passage received over said spud, an annular recess received over said floating ring, and a peripheral air passage that opens into said annular recess such that said central and peripheral air passages open to said cooling wind and said vacuum passages in said base through said spud and said floating ring respectively.

2. The bottom plate mounting arrangement set forth in claim 1 wherein said floating ring has an opening and said spud is threaded into said opening so as to be of integral construction with said floating ring.

3. The bottom plate mounting arrangement set forth in claim 2 wherein said spud has an external seal in sliding sealing engagement with said central air passage in said bottom plate.

4. The bottom plate mounting arrangement set forth in claim 3 wherein said floating ring has an external seal in sliding sealing engagement with an inwardly facing surface of said annular recess in said bottom plate.

5. The bottom plate mounting arrangement set forth in claim 3 including a face seal in sliding sealing engagement between said base and said floating ring between said cooling wind and vacuum passages in said base.

6. The bottom plate mounting arrangement set forth in claim 5 including a second face seal between said floating ring and an undersurface of said cap plate.

7. A glassware mold bottom plate mounting arrangement in a glassware forming machine, which includes:
    a base and a cap plate on said base,
    a floating ring captured by said cap plate on said base for limited lateral movement with respect to said base and said cap plate,
    wherein said floating ring has an annular flange that underlies said cap plate,
    a hollow cylindrical spud rigidly secured to said floating ring and extending from said floating ring away from said base,
    a cooling wind passage in said base opening through said hollow spud,
    a vacuum passage in said base opening through said floating ring at a position spaced from said spud,
    a glassware mold bottom plate removably telescopically received over said floating ring and said spud, said bottom plate having a central air passage received over said spud, an annular recess received over said floating ring, a peripheral air passage that opens into said annular recess such that said central and peripheral air passages open to said cooling wind and vacuum passages in said base through said spud and said floating ring respectively,
    an annular seal on said spud in sliding sealing engagement with said central air passage in said bottom plate, and
    an external seal on said floating ring in sliding sealing engagement with an inwardly facing surface of said annular recess in said bottom plate.

8. The bottom plate mounting arrangement set forth in claim 7 including an annular face seal carried by said base in sliding sealing engagement with floating said ring between said cooling air and vacuum passages in said base.

9. The bottom plate mounting arrangement set forth in claim 8 including a second annular seal carried by a peripheral ledge on said floating ring in sliding sealing engagement between said peripheral ledge and an undersurface of said cap plate.

10. The bottom plate mounting arrangement set forth in claim 9 wherein said floating ring has a central opening and said spud is threaded into said central opening so as to be of integral construction with said floating ring.

11. A glassware mold bottom plate mounting assembly that includes:
    a base having a surface, a ring and a cap plate capturing said ring in sliding engagement with said surface,
    wherein said ring has an annular flange that underlies said cap plate, a hollow spud rigidly centrally mounted on said ring so as to be of integral construction with said ring, an annular collar on said ring surrounding and spaced from said spud, at least one passage through said ring between said spud and said collar, a cooling wind passage in said base in registry with said spud, a vacuum passage in said base in registry with said at least one passage in said ring, face seals between said ring and said surface surrounding said cooling wind passage, and between a periphery of said ring and said cap plate, and annular seals on an outer surface of said spud and an outer surface of said collar for sliding sealing engagement with a glassware mold bottom plate telescopically received over said spud and said collar.

12. The assembly set forth in claim 11 wherein one of said face seals is carried by said flange in sealing engagement with an undersurface of said cap plate.

13. The assembly set forth in claim 12 wherein another of said face seals is carried by said base surrounding said cooling wind passage in said base between said base and said ring.

14. The assembly set forth in claim 13 wherein said at least one passage in said ring includes a plurality of angularly spaced passages in said ring between said collar and said spud.

* * * * *